United States Patent [19]
Ivers

[11] 3,708,681
[45] Jan. 2, 1973

[54] POSITION AND VELOCITY SENSOR
[75] Inventor: Richard J. Ivers, Arlington, Mass.
[73] Assignee: Dynamics Research Corporation, Wilmington, Mass.
[22] Filed: April 1, 1971
[21] Appl. No.: 130,073

[52] U.S. Cl. ..........................250/231 R, 250/237 G
[51] Int. Cl............G01d 5/34, H01j 3/14, H01j 5/16
[58] Field of Search....250/211 K, 237, 237 G, 231 R

[56] References Cited

UNITED STATES PATENTS

| | | | |
|---|---|---|---|
| 3,389,266 | 6/1968 | Okuno | 250/237 R |
| 3,435,245 | 3/1969 | Lee | 250/237 R |
| 3,590,261 | 6/1971 | Snook | 250/237 G |
| 1,985,044 | 12/1934 | Lyle | 250/237 R |

Primary Examiner—James W. Lawrence
Assistant Examiner—T. N. Grigsby
Attorney—Weingarten, Maxham & Schurgin

[57] ABSTRACT

An electro-optical transducer capable of producing output signals representative of both speed and position of a movable element. A scale has formed thereon a first track having a ruled pattern from which is produced an interference pattern having sensible light variations from which are derived a first output signal representative of relative scale position. A second track on the scale has a linearly varying optical response from which a second output signal is derived representing the velocity of scale movement. Additional signals can also be derived from the scale indicative of extreme scale positions.

9 Claims, 8 Drawing Figures

PATENTED JAN 2 1973

INVENTOR
RICHARD J. IVERS
BY
*Weingarten, Maxham & Schurgin*
ATTORNEYS

PATENTED JAN 2 1973  3,708,681

INVENTOR
RICHARD J. IVERS
BY
ATTORNEYS

POSITION AND VELOCITY SENSOR

FIELD OF THE INVENTION

This invention relates to electro-optical transducers and more particularly to a transducer for providing output signals representative of position and velocity of a moving element.

BACKGROUND OF THE INVENTION

It is often required to determine the position of an element along a predetermined path of travel and to provide a measure of the rate of travel along the path. Such position and rate measurements are often employed in a servo control system for accurately governing the speed and position of a moving element. Heretofore, position determination has been accomplished by a single instrumentality while a separate instrumentality has been employed for rate determination. Position determination is generally accomplished by means of an electro-optical encoder in which variations in light provided by an interference pattern produced from a ruled scale provide a measure of relative scale position. Rate determination has generally been accomplished by use of magnetic transducers in which the rate of flux change provides a measure of velocity. Such magnetic transducers are, however, relatively cumbersome, and in use exhibit stray magnetic fields which can produce often intolerable magnetic interference in systems with which such transducers are employed.

SUMMARY OF THE INVENTION

In accordance with the present invention, a unitary electro-optical transducer is provided which produces electrical output signals representative of both the speed of a movable element and of its position along a predetermined path of travel. Briefly, the invention comprises a scale having formed thereon a ruled pattern of alternately light responsive and non-responsive segments. An interference pattern is produced from the ruled scale from which are derived electrical signals representative of the relative position of an element and the associated scale. The scale also includes a second track which provides light response of a magnitude which linearly increases along the active length thereof. Such a track can be a pattern of linearly increasing transmissivity or reflectivity. A photosensor array is arranged with respect to the optical scale and includes a plurality of photosensors arranged with respect to the ruled track for providing signals representative of relative scale position and with respect to the second track for providing signals representing scale velocity. Photosensors can also be provided for sensing the extremities of the optical scale to denote end of travel positions.

DESCRIPTION OF THE DRAWINGS

The invention will be more fully understood from the following description taken in conjunction with the accompanying drawing, in which.

DETAILED DESCRIPTION OF THE INVENTION

Figure 1:
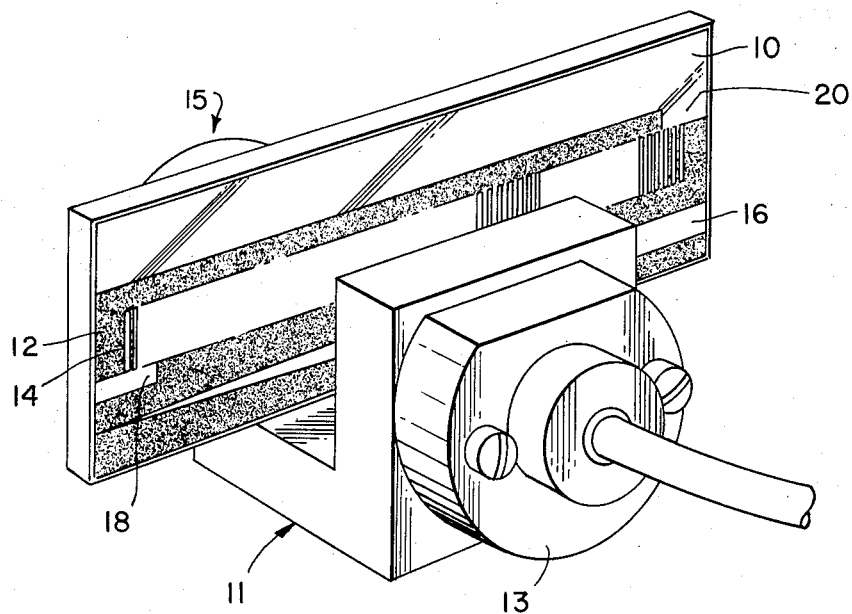
FIG. 1 is a pictorial view of a linear encoder embodying the invention.
Figure 2:
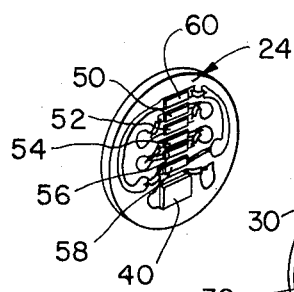
FIG. 2 is an exploded pictorial view of the encoder of FIG. 1.

The invention as embodied in a linear encoder is illustrated in pictorial view in FIG. 1 and in exploded view in FIG. 2. An elongated scale 10 of generally rectangular cross section is mounted for relative longitudinal motion with respect to an assembly 11 which includes a housing 13 and a housing 15 on respective opposite sides of scale 10. Usually but not necessarily, assembly 11 is stationary while scale 10 is movable in relation to assembly 11. In use, the scale is affixed to a movable element such as a carriage of a machine tool or the magnetic-head assembly of a magnetic disc memory, and according to the invention signals are derived from scale 10 representing the velocity of movement of the scale and associated moving element as well as the position of scale 10 relative to stationary assembly 11.

Scale 10 has provided thereon a first track 12 of generally uniform width and composed of a plurality of alternately light responsive and non-responsive segments 14 extending in a regular array along an active length of scale 10. In the illustrated embodiment, the segments 14 are alternately light transmissive and opaque. A second track is provided on scale 10 in the form of a light transmissive wedge pattern 16 of a length substantially coextensive with the length of track 12, and of a width which linearly increases from one end to the opposite end thereof. In the illustrated embodiment the wedge 16 is of linearly increasing height, but, alternatively, a pattern of uniform height can be provided having linearly increasing transmissivity along the length of the scale. A transmissive area 18 is provided at one end of the pattern 14 while a second transmissive area 20 is provided on the other end of pattern 14. As will be described, the pattern 14 is cooperative with a like ruled pattern to provide an interference pattern from which are derived electrical signals representative of the position of scale 10 relative to a reference point. The pattern 16 is operative to provide an electrical signal representative of the velocity of scale 10 with respect to a stationary reference.

A housing 11 on one side of scale 10 contains a reticle plate 22 cooperative with the respective tracks of scale 10, and a plurality of photosensors arranged on a circuit board 24 for sensing the light transmitted by the respective tracks of scale 10. The reticle plate 22 includes a pattern 26 of alternately light transmissive and opaque segments identical to pattern 14 formed on scale 10. The pattern 26 is disposed in alignment with pattern 14 to provide an intended interference pattern sensible by photosensors on board 24. An aperture 28 is provided in plate 22 in alignment with wedge 16 and of a height equal to or somewhat greater than the major height of wedge 16. A pair of light transmissive slits 30 and 32 are disposed respectively above and below pattern 26 in a position to sense light transmitted through respective areas 20 and 18 for providing end of travel information, as will be further described.

The pattern 26 is skewed with respect to the pattern 14 to produce fringes which, upon movement of scale 10, move in a direction parallel to the rulings of pattern 14, that is across the width of scale 10. As is well known, these moving fringes are sensible to provide an indication of the extent of relative scale movement and the sense of such movement. Photosensors 50, 52, 54 and 56 are arranged to sense the fringe pattern produced by patterns 14 and 26, as will be described below.

A housing 13 on the side of scale 10 opposite to housing 11 contains a light source for appropriate illumination of the respective areas of scale 10. As seen more particularly in FIG. 2, a lamp 34 and collimating lens 56 are disposed in alignment with pattern 14 to direct a collimated light beam therethrough and also through cooperative pattern 36 to provide an interference pattern sensible by means of photosensors to provide one electrical output. A light source 38 and associated collimating lens 40 are disposed in alignment with pattern 16 for directing a light beam therethrough from which is derived a second device output signal. The light beam from lamp 34 is of sufficient extent to also illuminate areas 18 and 20 adjacent pattern 14 at the respective extremities thereof, the light transmitted through slits 30 and 32 being received by respective photosensors for providing signals representing extreme positions on each end of scale 10.

Figure 3:
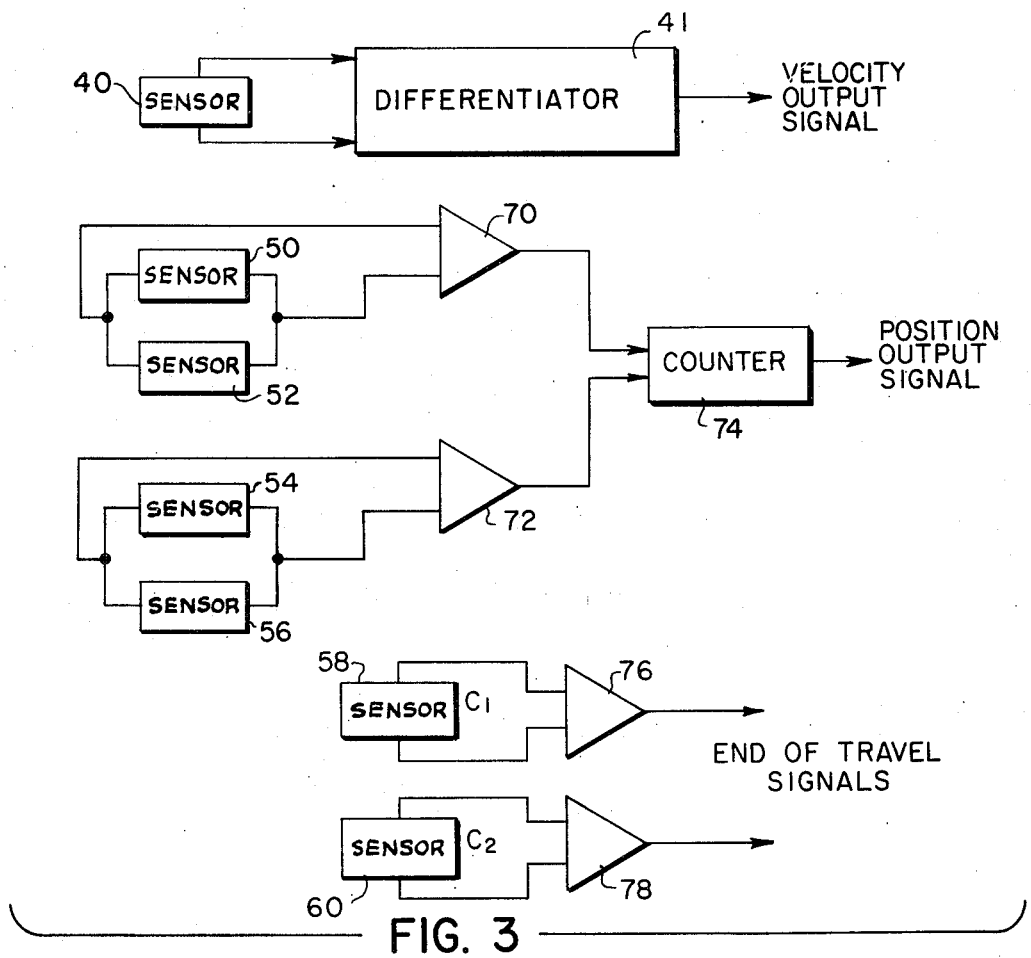
FIG. 3 is a schematic representation of the photosensor array and associated circuitry of the embodiment of FIG. 1.

An array of photosensors shown in typical embodiment in FIG. 2 is employed to sense light from the respective areas of scale 10 to provide respective output signals representative of relative scale velocity, relative scale position and extreme end positions of scale 10. The photosensor array is illustrated schematically in FIG. 3 together with associated circuitry. A relatively large photosensor 40 is operative to receive light transmitted through pattern 16 and aperture 28 and to produce an output signal of a magnitude corresponding to the amount of light received from pattern 16. Since the pattern 16 is of increasing transmissivity from one end of scale 10 to the other end thereof, a varying amount of light is transmitted through pattern 16 depending on the position of scale 10 relative to the aperture 28 of stationary plate 22. As the scale moves, photosensor 40 receives light varying in accordance with the height of pattern 16 and produces an output signal similarly varying. The output of photosensor 40 is electronically differentiated in differentiator 41 to provide an output signal representative of the relative velocity of scale 10.

The interference pattern provided by cooperation between pattern 14 and pattern 26 is sensed by photosensors 50, 52, 54 and 56. These photosensors are arranged in two pairs, each pair being electrically connected in phase opposition to provide a respective output signal. In the illustrated embodiment, photosensors 50 and 52 are arranged in phase opposition to provide a first output signal $e_1$, while photosensors 54 and 56 are similarly connected to provide a second output signal $e_2$. Each pair of photosensors is physcially disposed spatially 90° from the other pair such that the output signals are in electrical phase quadrature for providing an indication of the sense of movement of scale 10, as is well known in the optical encoder art. The back-to-back electrical interconnection of each pair of photosensors provides output signals which are compensated for DC variations which can occur due to variations in the transparency of scale 10 or minor irregularities in the ruling of optical pattern 14 and 26 and can effect encoder accuracy. The output signals from each pair of photosensors are suitably processed to provide an output indication of relative scale position. For example, each output signal can be respectively amplified in amplifiers 70 and 72, the amplified output signals being applied to a bidirectional counter 74 which provides a digital output signal directly representative of scale position.

It is often useful to indicate when scale 10 has reached an extremity of its active length and for this purpose photosensors 58 and 60 are provided to sense light transmitted through respective slits 32 and 30 when in alignment with transmissive areas 18 and 20 of scale 10 in order to provide electrical output signals indicative of scale extreme positions. Such end of travel signals are useful for example to stop or reverse a motion driving the movable element coupled to scale 10. The sensors 58 and 60 are coupled to respective amplifiers 76 and 78 which provide amplified end of travel signals for use on utilization-circuitry.

Figure 4:
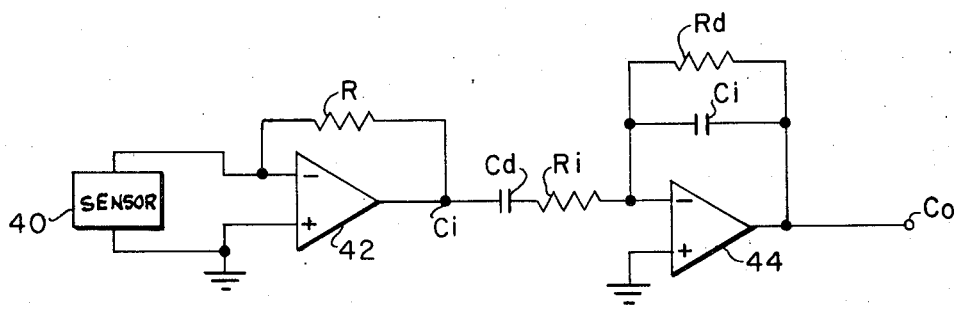
FIG. 4 is a schematic representation of a differentiator circuit useful in the invention.

A typical differentiator circuit useful in processing the output signal of photosensor 40 is depicted in FIG. 4. An operational amplifier 42 receives the output signal from photosensor 40 and the amplified output signal is differentiated in the succeeding stage to provide the intended output signal $e_o$. The differentiator stage includes a capacitor $C_d$ and resistor $R_i$ series connected between the output of amplifier 42 and the negative input of a differential input operation amplifier 44. The positive input of amplifier 44 is grounded as is the positive input of amplifier 42. A resistor $R_d$ and capacitor $C_i$ are each connected in shunt across amplifier 44 from the output to the negative input thereof.

The transfer function of this stage is $$e_o = \frac{R_d C_d S}{(1+\tau s)^2} e_i$$

where $\tau = R_i C_d = R_d C_i$ and $s$ is the complex operator.

The time constant $\tau$ of this circuit is selected to be sufficiently small so that proper differentiation occurs within the bandwidth of the inner loop of a servo control system in which the invention may be employed. The sensitivity of the differentiated output is determined by the resistor $R_d$ and capacitor $C_d$. If, for example, the produce $R_d C_d$ is 0.01 seconds, then with an amplified photosensor signal ($e_i$) of 10 volts per 2 inches of scale movement, the overall velocity sensitivity is 50 millivolts per inch per second.

Figure 5A:
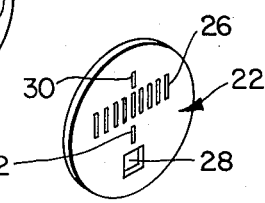
FIG. 5A is a diagrammatic representation of a reflective encoder embodying the invention.
Figure 5A:
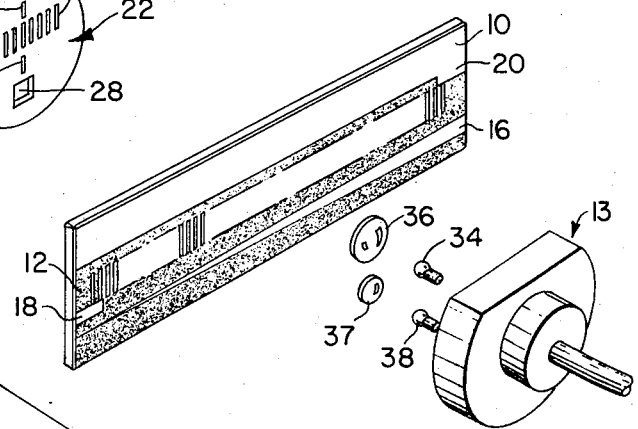
Figure 5A:
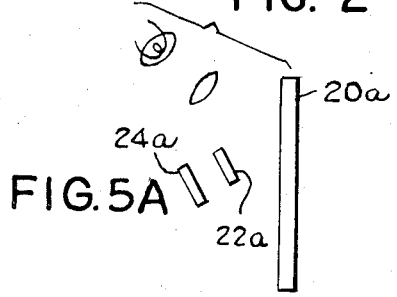
Figure 5:
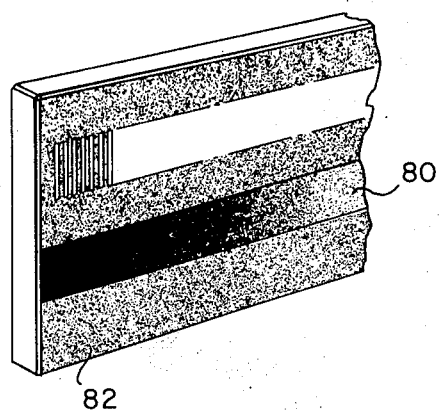
FIG. 5 is a pictorial view of an alternative encoder scale according to the invention.

An alternative scale configuration useful in the present invention is depicted in FIG. 5 wherein a track is provided on a surface of scale 82 of uniform height along the length of the scale but of a density which linearly increases from one scale end to the other. The other tracks of the scale are as in FIG. 1. This alternative scale embodiment is operative identically to the scale of FIG. 1 to provide output signals indicative of velocity and position and if desired, end of travel. Whereas the pattern 16 of scale 10 in FIG. 1 provides variable intensity light depending upon the position of scale 10 by reason of the varying height of pattern 16, the scale of FIG. 4 provides such variable intensity light by means of the graded density or transmissivity of the pattern 80 of scale 82. As described above, the photosensor 40 receiving light from the variable transmissivity scale pattern provides a direct current output signal of a magnitude proportional to the distance traveled by scale 10, and by differentiation of this signal an output signal is provided representing scale velocity.

In the embodiment of the invention described thus far, the optical patterns provided on a scale are light transmissive. The invention is equally applicable however with reflective types of scale patterns. For example, the pattern 14 can be alternately light reflective and opaque. Similarly, the pattern 16 can be reflective and of wedge shape or of uniform height and varying reflectivity along the length thereof. With such a reflective scale 20a, as shown in FIG. 5A, the light source and optical receiving assembly are both disposed on the same side of the scale and light is angularly directed at the scale patterns and received by appropriate reticle and photosensor elements 22a and 24a to provide device output signals.

It will be appreciated that the invention can also be embodied in a variety of electro-optical encoders to provide velocity and position sensing. For example, the variably transmissive or reflective pattern for providing velocity information can be incorporated into a rotary encoder disc as well as the linear encoder scale illustrated herein. Moreover, the velocity sensing scale can be employed with imaging type encoders in which an image of the ruled pattern 14 is superimposed on a portion of the rulings to provide the intended fringe pattern.

Figure 6:
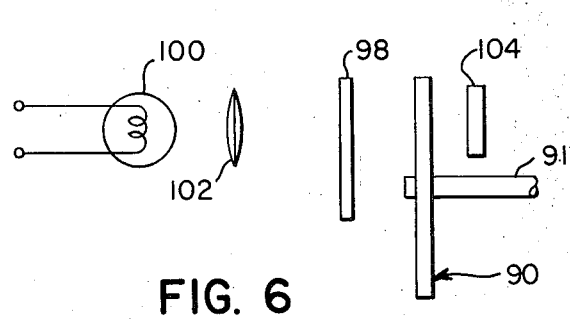
FIG. 6 is a diagrammatic representation of a rotary encoder embodying the invention.
Figure 7:
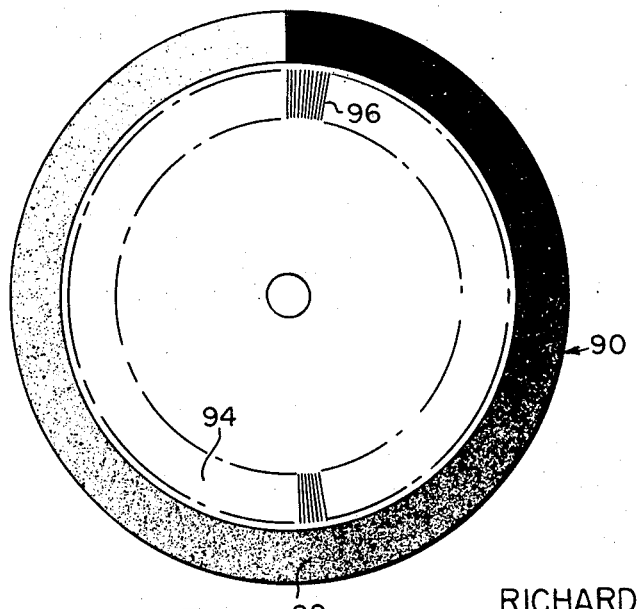
FIG. 7 is a plan view of an encoder disc according to the invention.

A rotary encoder constructed according to the invention is illustrated in FIG. 6, the encoder disc being shown more fully in FIG. 7. The disc 90 is mounted on a shaft 91 for rotation and has a circumferential track 92 formed around the disc periphery, the track being of linearly graded density therearound to provide a linearly varying light transmissivity. The variable light transmission can also be provided as described above by use of a track of uniform density but of varying light transmitting width. A second track 94 concentric with track 92 can also be provided on the disc and having a plurality of alternately light transmissive and opaque rulings 96, the ruled track 94 being employed in a well known manner for rotary position determination. Position information is sensed from track 94 by use of a cooperating reticle and associated light source and photosensor such as described in connection with the linear encoder hereinabove. Velocity information is also sensed in the manner described hereinabove. Referring to FIG. 6 a slit plate 98 has the slit therein aligned with the variably transmissive track 92, illumination being provided by lamp 100 and lens 102. Light transmitted through track 92 is received by photosensor 104 which provides an output signal of variable magnitude and from which the rotational velocity of disc 90 can be determined. Electric processing of the photosensor output signal is as described above.

Various modifications and alternative implementations of the invention will occur to those versed in the art without departing from the true scope of the invention. Accordingly, it is not intended to limit the invention by what has been particularly shown and described except as indicated in the appended claims.

What is claimed is:

1. An electro-optical transducer for providing position and velocity sensing and comprising:
   a scale having a first track composed of alternately light responsive and non-responsive segments and a second track having a linearly varying optical response along the active length thereof;
   means for illuminating a portion of said first and second tracks;
   optical means cooperative with said first track for providing an interference pattern having sensible light variations;
   said scale and said optical means being adapted for relative movement therebetween;
   means for sensing the light variations of said interference pattern to provide a first output signal representative of relative scale position; and
   means for sensing the variable optical response of said second track for providing a second output signal representative of relative scale velocity.

2. An electro-optical transducer according to claim 1 wherein said first track is composed of alternately light reflective and opaque segments and wherein said second track has linearly increasing light reflectance along the active length thereof.

3. An electro-optical transducer according to claim 1 wherein said sensing means includes
   photosensor means operative in response to light from said second track for providing an electrical photosensor signal; and
   a differentiator circuit operative in response to said electrical photosensor signal for providing said second output signal representative of relative scale velocity.

4. An electro-optical encoder according to claim 1 including
   first and second light responsive areas disposed on respective ends of the active length of said scale and defining end of travel positions thereon; and
   means for sensing light from said first and second areas for providing output signals representative of end of travel positions.

5. An electro-optical transducer according to claim 4 wherein said optical means includes
   a reticle plate having a pattern of alternately light responsive and non-responsive segments cooperative with the segments of said first track for providing said interference pattern;
   said reticle plate further including:
   an aperture in alignment with said second track to permit transmission of light from said illuminating means to said second track sensing means; and
   first and second slit apertures, each disposed in said reticle plate in a position to be in alignment with a respective one of said first and second light responsive areas at respective ends of the active length of said scale.

6. An electro-optical transducer according to claim 1 wherein said first track is composed of alternately light transmissive and opaque segments and wherein said second track has linearly increasing light transmission along the active length thereof.

7. An electro-optical transducer according to claim 6 wherein said second track has a wedge shaped aperture of linearly increasing height along the active length thereof.

8. An electro-optical encoder according to claim 6 wherein said second track has a light transmission pattern of uniform height and of transmission density which linearly increases along the length thereof.

9. An electro-optical transducer for providing position and velocity sensing and comprising:

an elongated scale adapted for motion relative to a reference position and having a first track composed of alternately light transmissive and opaque segments formed on a surface thereof along the active length of said scale, and a second track having a linearly increasing transmissivity along the active length of said scale;

a reticle having a pattern of alternately light transmissive and opaque segments identical to said first track and disposed with respect to said first track to provide an interference pattern;

means for illuminating a portion of said first track and said reticle pattern;

means for sensing the light variations of said interference pattern upon motion of said scale to provide a first output signal representative of relative scale position;

means for illuminating a portion of said second track; and means for sensing the variable light transmission of said second track during motion of said scale to provide a second output signal representative of relative scale velocity.

* * * * *